US011898108B2

(12) United States Patent
Bonnardot et al.

(10) Patent No.: US 11,898,108 B2
(45) Date of Patent: Feb. 13, 2024

(54) HYDROCRACKING PROCESS

(71) Applicant: AXENS, Rueil-Malmaison (FR)

(72) Inventors: Jerome Bonnardot, Rueil-Malmaison (FR); Hugues Dulot, Rueil-Malmaison (FR); Alexis Paillier, Rueil-Malmaison (FR); Jerome Pigourier, Rueil-Malmaison (FR); Nicolas Pupat, Rueil-Malmaison (FR)

(73) Assignee: AXENS, Rueil-Malmaison (FR)

( * ) Notice: Subject to any disclaimer, the term of this patent is extended or adjusted under 35 U.S.C. 154(b) by 0 days.

(21) Appl. No.: 17/841,829

(22) Filed: Jun. 16, 2022

(65) Prior Publication Data

US 2022/0403262 A1 Dec. 22, 2022

(30) Foreign Application Priority Data

Jun. 17, 2021 (FR) ...................................... 2106409

(51) Int. Cl.
*C10G 67/02* (2006.01)
*B01D 3/14* (2006.01)
*B01D 3/34* (2006.01)
*B01D 3/42* (2006.01)
(Continued)

(52) U.S. Cl.
CPC .............. *C10G 67/02* (2013.01); *B01D 3/143* (2013.01); *B01D 3/346* (2013.01); *B01D 3/42* (2013.01); *B01J 19/0006* (2013.01); *B01J 19/245* (2013.01); *B01J 2219/0004* (2013.01);
(Continued)

(58) Field of Classification Search
CPC .............. C10G 67/02; C10G 2300/308; C10G 2300/4081; C10G 47/00; C10G 65/12; C10G 47/22; C10G 49/22; C10G 67/00; C10G 2300/1096; C10G 2300/4006; C10G 2300/4012; B01D 3/143; B01D 3/346;
(Continued)

(56) References Cited

U.S. PATENT DOCUMENTS 2,297,098 A * 9/1942 Carney ................ B01D 3/4238
202/160
10,465,127 B2 11/2019 Sauge et al.
2017/0342331 A1* 11/2017 Sauge ...................... C10G 7/00

FOREIGN PATENT DOCUMENTS

WO 2016102301 A1 6/2016

OTHER PUBLICATIONS

Search Report in corresponding FR 2106409 dated Feb. 16, 2022 (pp. 1-2).

* cited by examiner

*Primary Examiner* — Randy Boyer
*Assistant Examiner* — Juan C Valencia
(74) *Attorney, Agent, or Firm* — Millen, White, Zelano & Branigan, P.C.; Brion P. Heaney

(57) ABSTRACT

A process for hydrocracking a petroleum feedstock involves:
(a) hydrocracking the feedstock to obtain a hydrocracked effluent;
(b) liquid/gas separation of the effluent to obtain a gaseous effluent and a liquid effluent;
(c) fractionating the liquid effluent at a pressure P1, producing a first distillate and a first residue,
(d) recycling a first portion of the first residue to hydrocracking,
(e) rectifying a second portion of the first residue at a pressure P2 lower than or equal to the pressure P1, to obtain a secondary distillate, a secondary residue and a vapor stream, (Continued)

(f) purging a portion of the secondary residue, and
(g) recycling all or part of the secondary distillate to hydrocracking.

22 Claims, 2 Drawing Sheets

(51) Int. Cl.
    *B01J 19/00*       (2006.01)
    *B01J 19/24*       (2006.01)

(52) U.S. Cl.
    CPC ............... *B01J 2219/00162* (2013.01); *C10G 2300/308* (2013.01); *C10G 2300/4081* (2013.01)

(58) Field of Classification Search
    CPC ....... B01D 3/42; B01J 19/0006; B01J 19/245; B01J 2219/0004; B01J 2219/00162
    See application file for complete search history.

HYDROCRACKING PROCESS

TECHNICAL FIELD

The invention relates to a process for hydrocracking a petroleum feedstock. It is recalled that the hydrocracking (also denoted under the term hydroconversion) of heavy petroleum cuts is a key process in refining which makes it possible to produce, from surplus and sparingly upgradable heavy feedstocks, lighter fractions, such as petrols, jet fuels and light gas oils, which refiners want in order to adapt their production to demand. Certain hydrocracking processes make it possible to also obtain a highly purified residue that may constitute excellent bases for oils.

PRIOR ART

Hydrocracking processes are commonly used in refinery for transforming hydrocarbon mixtures into readily upgradable products. However, they are customarily used more for converting heavier feedstocks (such as heavy synthetic or petroleum cuts, for example gas oils resulting from vacuum distillation or effluents from a Fischer-Tropsch unit) into petrol or naphtha, kerosene, gas oil. This process is also used to produce oils or to transform light cuts such as, for example, petrols into lighter LPG (liquid petroleum gas) cuts.

In order to increase the conversion of the feedstocks treated in hydrocracking units, a portion of the unconverted feedstock can be recycled, for example to the reaction section through which it has already passed or to an independent reaction section. This leads to an undesirable accumulation of polycyclic aromatic compounds, formed in the reaction section during the cracking reactions, in the recycle loop. These compounds poison the hydrocracking catalyst, which reduces the catalytic activity of the catalyst in question, and also the production cycle time of the unit. These compounds may also precipitate or be deposited in the cold parts of the unit, thus giving rise to malfunctions.

These polycyclic or polynuclear aromatic compounds therefore comprise several fused benzene rings. They are customarily referred to as HPNA, which is the initialism corresponding to the term "Heavy Polynuclear Aromatics".

Typically, HPNAs comprise at least four, or even at least six benzene rings in each molecule. Compounds containing less than six rings (derivatives of pyrene for example) can be more easily hydrogenated, and are therefore less likely to poison catalysts. Consequently, the invention is more particularly interested in the compounds that are the most representative of families containing six aromatic rings or more, such as for example coronene (compound containing 24 carbons), dibenzo(e,ghi)perylene (26 carbons), naphtho[8,2,1-abc]coronene (30 carbons) and ovalene (32 carbons), which are the compounds that are most easily identifiable and quantifiable, for example by chromatography.

Patent EP3237577 proposes a first solution for treating HPNAs, by concentrating them in the unconverted fractions in order to eliminate them and reduce the amount of purged residue in order to increase the conversion, with a hydrocracking process in which a stream is drawn off as a side-stream from the fractionating column between the feed tray and the bottom of the column. At least one portion of said stream constitutes the recycle stream. This stream may optionally be stripped in a stripping column. The light fraction obtained after stripping is sent back to the fractionating column and the heavy fraction resulting from the stripping is recycled to the hydrocracking step.

Patent application WO2012/052042 proposes another solution, with a hydrocracking process in which a portion of the stream from the bottom of the fractionating column (residue) is stripped in a stripping column. The light fraction obtained after stripping is sent back to the fractionating column and the heavy fraction resulting from the stripping is at least partly purged, it being possible for the other portion of this fraction to be recycled to the stripping column.

These processes have brought about improvements in terms of reducing the HPNAs, but often to the detriment of the yields (and/or the equipment or production costs).

The aim of the invention is then to improve the hydrocracking processes, in order to reduce the formation of the polycyclic aromatic compounds and/or to eliminate these compounds. The invention additionally aims to maintain the yield of the hydrocracking to upgradable products at an identical or similar level, and/or to not significantly increase the equipment or production costs of the hydrocracking unit.

SUMMARY OF THE INVENTION

The invention firstly relates to a process for hydrocracking a petroleum feedstock comprising at least 10% by volume of compounds that boil above 340° C., comprising:
 (a) at least one step of hydrocracking the feedstock in order to obtain a hydrocracked effluent;
 (b) a step of liquid/gas separation of the hydrocracked effluent in order to obtain a gaseous effluent and a liquid effluent;
 (c) a step of fractionating said liquid effluent, carried out in at least one column, at a pressure P1 at the bottom of the column, in particular of between 0.2 and 0.4 MPa, producing at least a first distillate and a first residue,
 (d) a step of recycling a first portion of said first residue to the hydrocracking step and/or at least one of the hydrocracking steps,
 (e) a step of rectifying a second portion of the first residue obtained in the fractionating step, carried out in at least one column, at a pressure P2 at the top at least 0.05 MPa lower than the pressure P1, in order to obtain at least a secondary distillate, a secondary residue and a vapour stream,
 (f) a step of purging at least one portion or all of the secondary residue,
 (g) a step of recycling all or part, in particular all, of said secondary distillate to the hydrocracking step or to at least one of the hydrocracking steps, after an optional gas separation step.

The process according to the invention has therefore chosen firstly not to recycle the stream originating from the rectifying step directly to the fractionating step, but to the hydrocracking step, i.e. to a reaction section in which the stream will be transformed. Secondly, the process according to the invention has chosen to limit/lower the pressure in the rectifying step relative to the pressure of the fractionating step. It has turned out that lowering the rectification pressure in this way very significantly improved the efficiency of the separation carried out, and in fact concentrated the polycyclic aromatic hydrocarbons in the secondary residue (the unconverted fraction). Two highly advantageous consequences result therefrom: Firstly, this secondary residue, more concentrated in HPNA, can be purged, at least partly, or even completely, in order to be eliminated, which at the same time eliminates a greater proportion of HPNA than in the previous hydrocracking processes. Secondly, it is possible to send the distillate obtained in rectification back to the hydrocracking directly since it contains less/no HPNA capable of degrading the efficiency of the hydrocracking catalyst, which makes it possible to increase the conversion of the feedstock, to therefore improve the hydrocracking yield of upgradable products and/or to increase the catalyst cycle life compared to the previous hydrocracking processes.

The invention has discovered that it was possible to modify the operating conditions (addition of a cooling system for example) so as to recover the upgradable fraction in the secondary distillate, and therefore not to recycle the overhead vapour (since it no longer contains upgradable products). It is for this reason that the pressure can be lowered in the rectification, with the beneficial effects highlighted above.

It can thus be noted that it is notably because the recycling from the rectifying step to the fractionating step is abandoned (in favour of recycling to the hydrocracking step) that it was possible to lower the pressure during the rectification. The two characteristics are therefore linked, combined to achieve the desired effect on the HPNAs.

Another advantageous consequence of the invention should also be pointed out: since there is no longer recycling of all or part of the secondary distillate and/or of the secondary residue, which result from the rectification, to the fractionation, it is possible to reduce the size of the plants, notably by reducing the sizing of the fractionating column, and by removing the pieces of equipment that were necessary for the recycling from the rectifying column to the fractionating column.

It has furthermore been demonstrated that the invention was particularly effective for reducing the amount of HPNA present in hydrocracking specifically having at least 6 aromatic rings, which are the most resistant to the reactions used during the hydrocracking, which very particularly favours the increase in the catalyst cycle life compared to the prior processes.

As seen above, advantageously, the process according to the invention may be free of a step of recycling, to the fractionating step (c), all or part of the secondary distillate and/or all or part of the secondary residue which result from the rectifying step (e), and/or all or part of the overhead vapour stream which results from the rectifying step (e).

Preferably, the pressure P2 at the top of the column of the rectifying step is lower than the pressure P1 in the bottom of the column of the fractionating step (c) by at least 0.06 MPa, in particular by at least 0.08 MPa, preferably by at most 400 kPA or 0.4 MPa. It turns out that the greater the P1-P2 pressure difference, the more effective the separation and the more the content of HPNA increases in the secondary residue. Naturally, the difference must remain reasonable so that the lowering of the pressure P2 in the rectifying step is not too complex/expensive to obtain on the industrial scale of a hydrocracking unit.

Two variants are possible within the context of the invention: either the pressure P2 is chosen to be at a value which remains greater than or equal to atmospheric pressure, or it is chosen to be lower than atmospheric pressure. This pressure P2 is measured/chosen at the top of the column. In both scenarios, a pressure P2 of between 133 Pa (1 mmHg) and 1.101 MPa, and preferably between 1333 Pa (10 mmHg) an 0.08 MPa (600 mmHg) is preferably chosen.

Preferably, the rectifying step (e) makes provision for a distillation column equipped with feed tray(s), optionally with packing and with draw-off tray(s), and:

the first residue from the fractionating step (c), optionally at least partially vaporized, feeds said column at at least one feed tray, the secondary distillate is drawn off from said column at a draw-off tray, the secondary residue is drawn off at the bottom of said column, the overhead vapour stream is cooled, in particular by a circulating reflux or by a condensation system.

Preferably, the rectifying step is carried out using a stripping gas, for example based on steam or hydrogen, injected at an injection point in the column which is advantageously located below the feed tray of the column.

With the process according to the invention, the secondary distillate obtained in the rectifying step has an HPNA concentration of less than or equal to 500 ppm by weight, preferentially less than or equal to 350 ppm by weight, and very preferentially less than or equal to 200 ppm by weight. The secondary distillate is therefore highly depleted in HPNA, which is the objective of the invention.

This secondary distillate has, with the process of the invention, usually a proportion of at least 70% by weight of unconverted hydrocarbons, preferentially of at least 80% by weight of unconverted hydrocarbons and very preferentially of at least 90% by weight of unconverted hydrocarbons.

Preferably, the rectifying step (e) makes provision for a distillation column equipped with feed tray(s), optionally with packing and with draw-off tray(s), and said step is carried out with a stripping gas, in particular in the form of steam or hydrogen, preferably injected below the or at least one of the feed tray(s) of the column.

Preferably, in the rectifying step (e), the first residue is fed at a temperature of between 250° C. and 400° C.

The second portion of the first residue which is treated in the rectifying step (e) preferably corresponds to at most 50% by weight of the first residue obtained in the fractionating step (c), in particular to at most 20% by weight, preferably to around 10% by weight of said first residue. Thus, adjusting the amount of residue treated makes it possible to produce a secondary residue, the amount of which is sufficient to ensure the purging of the unit without it being necessary to recycle a portion thereof to the hydrocracking section.

It should be noted that, preferably, the first residue is only divided into two portions, the first, which is recycled to the hydrocracking step, and the second portion, which is treated in the rectifying step. At most 50% by weight of this residue treated in rectification therefore means that the balance to 100%, therefore that at least 50% of the residue, is recycled to the hydrocracking. It is therefore seen that a preferred embodiment according to the invention consists in predominantly recycling this residue.

It is possible, when recycling the first portion of the first residue to the hydrocracking, to carry out the recycling directly, or after an optional gas separation step.

In the purging step (f), preferably at least 20% by weight of the secondary residue is purged, in particular at least 40% by weight, and preferably at least 60% or at least 80% by weight of the secondary residue. According to one embodiment, it is all (100%) of the secondary residue that is purged. The amount of secondary residue which is not purged is preferably mixed with the secondary distillate and sent to the hydrocracking step.

Specifically it has been demonstrated that the secondary residue obtained with the process according to the invention generally has an HPNA concentration of greater than 1000 ppm by weight, preferentially greater than 1500 ppm by weight and even greater than 2000 ppm by weight: it is verified that the HPNAs have been properly concentrated in this residue, in order to be able to more easily eliminate them from the process, notably by a partial or total purging of this residue.

According to the invention, it is preferred to carry out the fractionating step and/or the rectifying step with a stripping gas, in particular in the form of steam.

The stripping gas of the fractionating step is preferably injected at a pressure of between 0.2 and 0.4 MPa.

The stripping gas of the rectifying step is preferably injected at a pressure of between 0.001 and 0.35 MPa. For the rectification, the stripping gas may also be hydrogen rather than steam.

The process according to the invention makes provision for one or two hydrocracking steps (a), as is known from hydrocracking processes. Preferably, the hydrocracking step or at least one of said steps when there are several, in particular two, thereof is preceded by a hydrotreating step (h). As is known, "hydrotreating" denotes all of the purification processes that allow the various impurities contained in hydrocarbon feedstocks to be removed through the action of hydrogen. The hydrotreating processes make it possible to remove, through the action of hydrogen, impurities present in the feedstocks such as nitrogen (then referred to as hydrodenitrogenation), sulfur (then referred to as hydrodesulfurization), oxygen (then referred to as hydrodeoxygenation), and the metal-containing compounds which can poison the catalyst and give rise to operating problems downstream (then referred to as hydrodemetallization). It is thus common for the hydrotreating process to in fact be a prior step of treating a feedstock by a hydroconversion/hydrocracking type process.

In the case where the process according to the invention is a two-step hydrocracking, the operating conditions of each of these two steps are generally the following:

a temperature above 200° C., often between 250° C. and 480° C., advantageously between 320° C. and 450° C., preferably between 330° C. and 435° C., under a pressure of greater than 1 MPa, often between 2 and 25 MPa, preferably between 3 and 20 MPa, the space velocity is between 0.1 and 20 $h^{-1}$ and preferably between 0.1 and 6 $h^{-1}$, more preferably between 0.2 and 3 $h^{-1}$, the amount of hydrogen introduced is such that the liters of hydrogen/liters of hydrocarbon volume ratio is between 80 and 5000 Nl/l and usually between 100 and 3000 Nl/l.

The invention also relates to any hydrocracking plant carrying out the process according to the invention.

The invention also relates to a plant for hydrocracking a petroleum feedstock comprising at least 10% by volume of compounds that boil above 340° C., successively comprising:

(a) at least one section for hydrocracking the feedstock in order to obtain a hydrocracked effluent;

(b) at least one section for liquid/gas separation of the hydrocracked effluent in order to obtain a gaseous effluent and a liquid effluent;

(c) a section for fractionating said liquid effluent, comprising at least one column, at a pressure P1 at the bottom of the column in particular of between 0.2 and 0.4 MPa, producing at least a first distillate and a first residue, (d) a line for recycling a first portion of said first residue to the or one of the hydrocracking sections, (e) a section for rectifying a second portion of the first residue obtained in the fractionating zone, comprising at least one column, at a pressure P2 at the top at least 0.05 MPa lower than the pressure P1, in order to obtain at least a secondary distillate, a secondary residue and a vapour stream, (f) a section for purging at least one portion or all of the secondary residue, (g) a line for recycling all or part, in particular all, of said secondary distillate to the hydrocracking section or at least one of the hydrocracking sections, after an optional gas separation section.

The hydrocracking plant according to the invention is preferably free of a line for recycling all or part of the secondary distillate and/or all or part of the secondary residue which result from the rectifying zone (e) to the fractionating zone (c).

Preferably, the rectifying zone (e) is equipped with pressure control devices, either of pressure regulator type if the pressure P2 is greater than atmospheric pressure, or of vacuum device type if the pressure P2 is lower than atmospheric pressure, in particular a liquid ring pump or a system of ejectors.

According to one embodiment, this hydrocracking plant may comprise one or two hydrocracking section(s) equipped with a feedstock inlet line (1) and a hydrogen inlet line, the fractionating section comprising at least one distillation column equipped with trays, said column producing a first distillate and a first residue, the section for rectifying a second portion of the first residue, comprising at least one distillation column equipped with trays and/or packing, said column comprising: —at least one inlet line for the second portion of the first, at least partially vaporized residue at at least one feed tray, —at least one line connected to a pressure regulation or vacuum system, —at least one line for drawing off at least the secondary distillate at a draw-off tray, —at least one line for drawing off, at the bottom of the column, said secondary residue, at least one optional line for injecting a stripping gas, the injection point being located below the feed tray of the stream, an optional line for recycling a portion of said secondary residue resulting from the fractionating section directly to the or one of the hydrocracking section(s).

LIST OF FIGURES

FIG. 1 represents a block diagram of a hydrocracking process according to the prior art.

FIG. 2 represents a block diagram of a hydrocracking process according to a first embodiment of the invention.

FIG. 3 represents a block diagram of a hydrocracking process according to a second embodiment of the invention.

All of these figures are highly schematic, and the scale and spatial distribution of the various devices represented are not necessarily respected. References that are identical from one figure to the next correspond to the same compounds/lines/devices.

DESCRIPTION OF THE EMBODIMENTS

In the present text, the rectification is defined by a distillation that aims to purify a product by concentrating the undesirable compounds in one of the fractions resulting from the distillation.

In the present text, the feedstocks are defined by their boiling point T5 as is explained below). The conversion of the feedstock is defined relative to the cut point of the primary residue. The unconverted fraction is referred to as the primary residue. The converted fraction comprises the fractions desired by the refiner.

The purge portion refers to a portion which leaves the process.

Feedstocks:

Very varied feedstocks can be treated by hydrocracking processes. Generally, they contain at least 10% by volume, generally at least 20% by volume and often at least 80% by volume of compounds that boil above 340° C.

The feedstock may for example be LCOs (Light Cycle Oils), which are light gas oils resulting from a catalytic cracking unit), atmospheric distillates, vacuum distillates for example gas oils resulting from the direct distillation of crude oil or from conversion units such as FCC (Fluid Catalytic Cracking) units, coking units (cokers) or visbreaking units, and also feedstocks originating from units for the extraction of aromatics, lubricating oil bases or resulting from the solvent dewaxing of lubricating oil bases, or else distillates originating from processes for the fixed-bed or ebullated-bed desulfurization or hydroconversion of ARs (atmospheric residues) and/or VRs (vacuum residues) and/or deasphalted oils. The feedstock may also be a deasphalted oil, effluents from a Fisher-Tropsch unit or else any mixture of the abovementioned feedstocks. The above list is not limiting.

In general, the feedstocks have a boiling point T5 above 150° C. (i.e. 95% of the compounds present in the feedstock have a boiling point above 150° C.). In the case of diesel, the point T5 is generally around 150° C. In the case of VGO (vacuum gas oil), the T5 is generally above 340° C., or even above 370° C. The feedstocks that can be used are therefore over a wide range of boiling points. This range generally extends from diesel to VGO, passing through all possible mixtures with other feedstocks, for example LCO.

The nitrogen content of the feedstocks treated in the hydrocracking processes is usually greater than 500 ppm by weight, generally between 500 and 10 000 ppm by weight, more generally between 700 and 4500 ppm by weight and more generally still between 800 and 4500 ppm by weight.

The sulfur content of the feedstocks treated in the hydrocracking processes is usually between 0.01% and 5% by weight, generally between 0.2% and 4% by weight and more generally still between 0.5% and 3% by weight. The feedstock may optionally contain metals. The combined nickel and vanadium content of the feedstocks treated in the hydrocracking processes is preferably less than 10 ppm by weight, preferably less than than 5 ppm by weight, and more preferably still less than 2 ppm by weight. The asphaltene content is generally less than 3000 ppm by weight, preferably less than 1000 ppm by weight and even more preferably less than 300 ppm by weight.

Operating Conditions:

The operating conditions such as temperature, pressure, hydrogen recycle ratio or hourly space velocity are variable depending on the nature of the feedstock, on the quality of the products desired and on the plants available to the refiner. The hydrocracking/hydroconversion or hydrotreating catalyst is generally brought into contact, in the presence of hydrogen, with the feedstocks described above:

at a temperature above 200° C., often between 250° C. and 480° C., advantageously between 320° C. and 450° C., preferably between 330° C. and 435° C.;

under a pressure of greater than 1 MPa, often between 2 and 25 MPa, preferably between 3 and 20 MPa, the space velocity is between 0.1 and 20 $h^{-1}$ and preferably between 0.1 and 6 $h^{-1}$, more preferably between 0.2 and 3 $h^{-1}$, the amount of hydrogen introduced is such that the liters of hydrogen/liters of hydrocarbon volume ratio is between 80 and 5000 Nl/l and usually between 100 and 3000 Nl/l.

These operating conditions used in the hydrocracking processes generally make it possible to achieve conversions per pass, into converted products (i.e. having boiling points below the residue cut point) of greater than 15%, and more preferably still between 20% and 95%.

The Hydrocracking Units:

Embodiments

The hydrocracking/hydroconversion processes using the catalysts according to the invention cover pressure ranges and conversion ranges extending from mild hydrocracking to high-pressure hydrocracking.

Mild hydrocracking is understood to mean a hydrocracking which results in moderate conversions, generally of less than 40%, and which operates at low pressure, preferably between 2 MPa and 9 MPa.

The hydrocracking catalyst may be used alone, in one or more fixed-bed catalyst beds, in one or more reactors, in a "one-step" hydrocracking scheme, with or without liquid recycling of the unconverted fraction, optionally in combination with a hydrorefining catalyst located upstream of the hydrocracking catalyst.

The hydrocracking may be carried out at high pressure (at least 10 MPa).

The hydrocracking may, according to a first variant, be carried out according to a "two-step" hydrocracking scheme with intermediate separation between the two reaction zones, in a given step, the hydrocracking catalyst may be used in one or both reactor(s), optionally in combination with a hydrorefining catalyst located upstream of the hydrocracking catalyst.

The hydrocracking may be carried out according to a second variant, referred to as "one-step" hydrocracking. This variant generally comprises firstly a thorough hydrorefining, the aim of which is to perform thorough hydrodenitrogenation and desulfurization of the feedstock, before the feedstock is sent over the actual hydrocracking catalyst, in particular in the case where said catalyst includes a zeolite. This thorough hydrorefining of the feedstock only results in a limited conversion of this feedstock into lighter fractions. The conversion, which remains insufficient, is completed over the more active hydrocracking catalyst.

The hydrocracking section may contain one or more identical or different catalyst beds. When the preferred products are middle distillates, use is made of amorphous basic solids, for example alumina or silica-aluminas or basic zeolites, optionally supplemented with at least one group VIII hydrogenating metal and preferably also supplemented with at least one group VIB metal. These basic zeolites are composed of silica, alumina, and one or more exchangeable cations such as sodium, magnesium, calcium or rare-earth elements.

When petrol is the product predominantly desired, the catalyst is generally composed of a crystalline zeolite, onto which small amounts of a group VIII metal, and also more preferably of a group VIB metal, are deposited.

The zeolites that can be used are natural or synthetic, and may for example be chosen from X, Y or L zeolites, faujasite, mordenite, erionite or chabazite.

The hydrocracking may be carried out in a single or several ebullated-bed reactor(s), with or without liquid recycling of the unconverted fraction, optionally in combination with a hydrorefining catalyst located in a fixed-bed or ebullated-bed reactor upstream of the hydrocracking catalyst. The ebullated bed operates with removal of used catalyst and daily addition of fresh catalyst in order to retain a stable catalyst activity.

Guard Beds:

In the case where the feedstock contains compounds of resin and/or asphaltene type, it is advantageous to pass the feedstock beforehand over a bed of catalyst or of adsorbent different than the hydrocracking or hydrotreating catalyst. The catalysts or guard beds used have the shape of spheres (beads) or extrudates. Any other shape may be used. Among the particular shapes possible, nonlimitingly, mention may be made of hollow cylinders, hollow rings, Raschig rings, serrated hollow cylinders, crenellated hollow cylinders, cartwheels known as pentarings, multi-hole cylinders, etc.

These catalysts may optionally have been impregnated by an active phase. Preferably, the catalysts are impregnated by a hydrogenating-dehydrogenating phase. Preferably, the CoMo or NiMo phase is used. These catalysts may exhibit macroporosity.

Liquid/Gas Separation:

The separator carries out the separation of the liquid and gas present in the effluent leaving the hydrocracking unit. Any type of separator enabling this separation may be used, for example a flash vessel, a stripper, or even a simple distilling column.

Preferably, a series of separation vessels is used at various pressure and temperature levels, in a manner known to those skilled in the art.

Advantageously, in the variant of the invention with two hydrocracking steps, a portion or all of the separating section may be common to the two hydrocracking sections.

Fractionation:

The fractionation section generally consists of one or more columns comprising several internal trays and/or packings. These columns are customarily stripped with steam and optionally comprise one or more reboilers in order to facilitate the vaporization.

The fractionating section makes it possible to separate the hydrogen sulfide ($H_2S$) and the light components (methane, ethane, propane, butane, etc.) of the effluents, and also the hydrocarbon cuts having boiling points in the range of petrols, kerosene and gas oil and a heavy fraction recovered at the bottom of the column referred to as residue.

Optionally, the fractionating section comprises a stripping column used on all or on a portion of the streams resulting from the separating section.

The fractionating section comprises at least one column operated with a pressure P1 at the bottom. Preferably, this pressure P1 is between 0.2 and 0.4 MPa.

Rectification:

The rectification section generally comprises one or more columns, preferably one column, comprising several internal trays and/or packings.

These columns are, preferably, stripped with steam and optionally comprise at least one reboiler in order to facilitate the vaporization. It makes it possible to separate all or part of the residue resulting from the fractionating section into different hydrocarbon cuts having boiling points in the range of gas oil and vacuum distillate and a heavy fraction recovered at the bottom of the column, all or part of which is purged from the unit.

The rectifying section comprises at least one column operated with a pressure P2 at the top. The pressure P2 is less than or equal to the pressure P1 minus at least 0.05 MPa.

Preferably, said rectifying step is formed by a column equipped with trays and/or packing comprising at least 5 theoretical stages. Preferably, said at least partially vaporized residue feeds the column at at least one feed tray. Preferably, said secondary distillate is drawn off at a draw-off tray preferably located at least 2 theoretical stages above the injection point of the residue. Preferably, said secondary residue is drawn off at the bottom of the column, located preferably at least 2 theoretical stages below the injection point of the residue.

Preferably, the column is equipped with a cooling system that makes it possible to ensure an internal reflux. Any means known to those skilled in the art (condenser, circulating reflux, inter alia) may be envisioned.

Preferably, the overhead vapour fraction is discharged by means of a pressure regulating system or by a vacuum system. Any means known to a person skilled in the art (system of ejectors, liquid ring pump, inter alia) may be used in the case of a vacuum system. This fraction is not sent to the fractionating section.

Preferably, the pressure P2 of the rectifying section is at least 0.06 MPa, more preferentially at least 0.08 Mpa, lower than the pressure P1 of the fractionating section. The lower pressure makes it possible to maximize the separation and concentrate the HPNAs in the residue.

The pressure P2 of the rectifying section may be chosen to be greater than or equal to atmospheric pressure, controlled for example using a pressure regulating device. The pressure P2 of the rectifying section may alternatively be chosen to be lower than atmospheric pressure, obtain for example using a vacuum device. Preferably, P2 is greater than or equal to 1 mmHg (133 Pa) and very preferably P2 is greater than or equal to 10 mmHg (1333 Pa) and in particular at most 0.08 MPa (600 mmHg).

Preferably, the rectifying step is carried out using a stripping gas, consisting for example of steam or hydrogen, injected at an injection point located below the feed tray.

Figure 1:
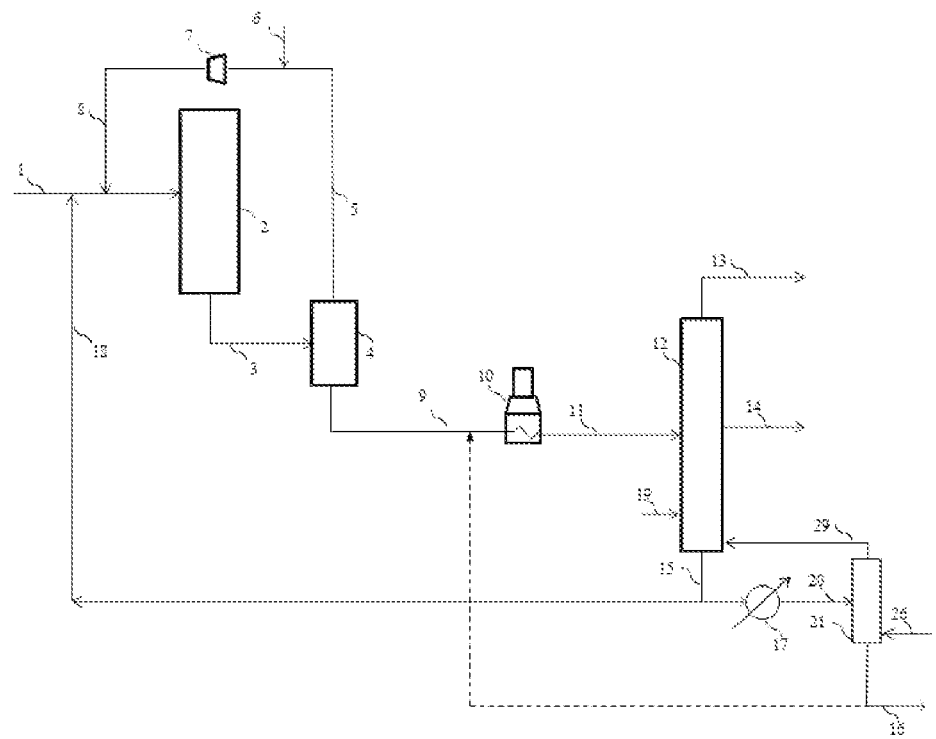
FIG. 1 represents a diagram of a hydrocracking process according to the prior art. The feedstock supplied through the line 1 is composed notably of hydrocarbons, and is mixed with hydrogen supplied through the recycle line 5 and/or makeup hydrogen line 6 via the compressor 7 and the line 8. The feedstock/hydrogen mixture thus produced is sent to the hydrocracking section 2. The hydrocracking section is generally preceded by a hydrotreating section (not represented) comprising one or more hydrotreating catalyst beds (it being possible for these beds to also be included in the hydrocracking section).

This hydrocracking section 2 comprises one or more fixed-bed or ebullated-bed reactors.

When the hydrocracking section 2 comprises one or more fixed-bed reactors, each reactor may comprise one or more catalyst beds carrying out the hydrocracking of the hydrocarbons of the feedstock to give lighter hydrocarbons.

When the hydrocracking section 2 comprises one or more ebullated-bed reactors, a stream, comprising liquid, solid and gas, circulates vertically through a reactor containing a catalyst bed. The catalyst in the bed is kept in random movement in the liquid. The gross volume of the catalyst dispersed through the liquid is therefore greater than the volume of the catalyst at a standstill. This technology is described in the literature.

A mixture of hydrocarbon liquid and hydrogen is passed through the bed of catalyst particles at a speed such that the particles are set in random motion and therefore suspended in the liquid. The expansion of the catalyst bed in the liquid phase is controlled by the flow rate of recycle liquid, so that in the equilibrium state, most of the catalyst does not exceed a given level in the reactor. The catalysts are in the form of extrudates or beads, preferably having a diameter between 0.8 mm and 6.5 mm.

In an ebullated-bed process, large amounts of hydrogen gas and light hydrocarbon vapours rise through the reaction zone, then into a catalyst-free zone. The liquid originating from the catalyst zone is, in part, recycled to the bottom of the reactor after separation of a gaseous fraction, and in part removed from the reactor as product, usually in the upper portion of the reactor.

The reactors used in an ebullated-bed process are generally designed with a central vertical recycle duct, which acts as a flow tube for the recycling of liquid from the catalyst-free zone located above the ebullated-bed catalyst, via a recycle pump, which makes it possible to recycle the liquid to the catalytic zone. The recycling of liquid makes it possible both to maintain the temperature uniformity in the reactor and to keep the catalyst bed in suspension.

The effluent from the hydrocracking section 2 is sent via line 3 to a separation zone 4, that makes it possible to recover, on the one hand, a gaseous fraction 5 and, on the other hand, a liquid fraction 9. The gaseous fraction 5 contains the excess hydrogen that has not reacted in the hydrocracking reaction section 2. It is generally combined with fresh hydrogen arriving through the line 6, in order to be recycled as specified above.

The liquid fraction 9 is heated by any means 10, for example a furnace and/or an exchanger (not represented), in order to be at least partly vaporized, before feeding the fractionating section 12 via the line 11.

The fractionating section 12 comprises one or more distillation columns, equipped with trays and internals that make it possible to separate various upgradable cuts (distillates) which are drawn off by means of the lines 13 and 14, plus optionally other sidestreams. These cuts have boiling point ranges located for example in the range of petrols, kerosene and gas oil. At the bottom of the column, an unconverted heavier fraction (residue) 15 is recovered.

Provision may be made for an injection of stripping gas via the line 19. This line is located between the tray for feeding hydrocracked effluent via the line 11, and the point for discharging the residue via the line 15.

According to FIG. 1, a portion of the residue 15 is recycled to the hydrocracking section 2 via the line 18, another portion is heated in a furnace or a heat exchanger 17, then is sent to the rectification column 21, making it possible to recover, on the one hand, a vapour distillate via the line 29 and, on the other hand, a liquid residue via the line 16. The vapour distillate, via the line 29, is recycled to the fractionation column 12. The residue is discharged from the unit via the line 16, and constitutes the purge. This purge 16 makes it possible in particular to at least partly eliminate the HPNA compounds which, without this purge, could accumulate in the recycle loop. The line represented as a dotted line is optional: provision may be made to send back one portion only of the residue leaving the rectification column 21, the remainder (or the whole residue in the absence of this line) being purged.

Figure 2:
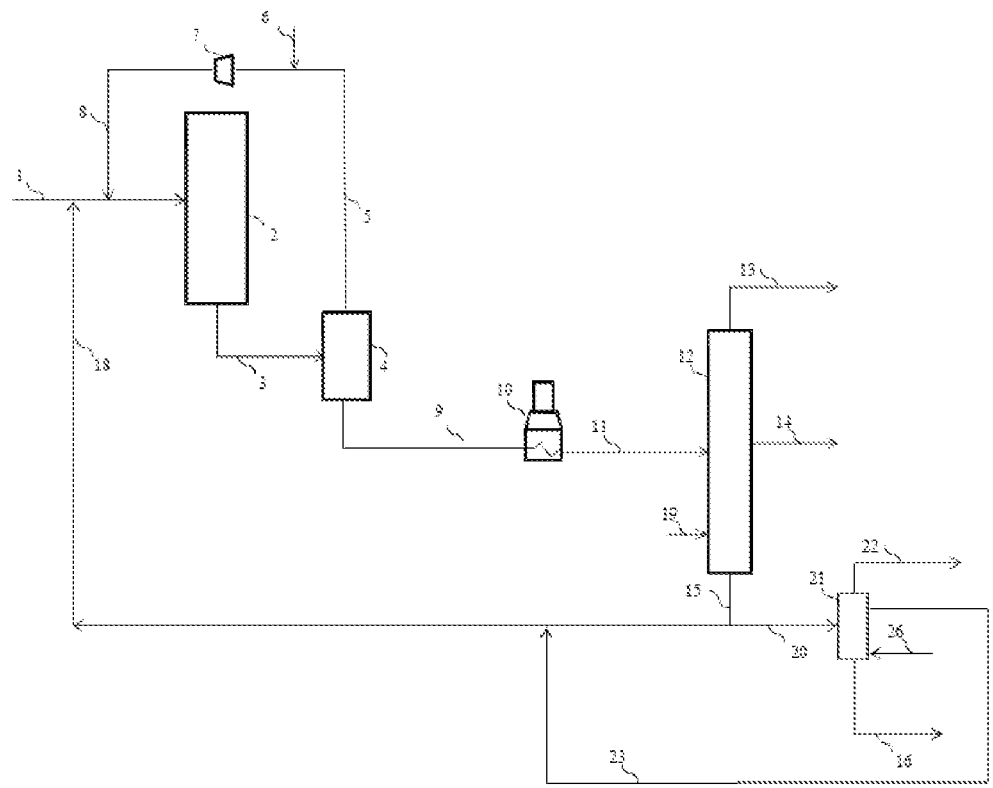

FIG. 2 represents a first embodiment of the process according to the invention. The elements described previously which are shared with FIG. 1 will not be repeated and it will be endeavoured to describe the differences with the scheme from FIG. 1.

A portion of the residue 15 resulting from the fractionating section 12 feeds the rectifying section 21 via the line 20. Preferably, the residue 20 feeding the rectifying section 21 is heated by any means, for example a furnace and/or an exchanger (not represented).

The rectifying section 21 comprises a distillation column equipped with trays and/or packing and also internals for separating various cuts: A secondary distillate is drawn off as sidestream by means of the line 23, there may optionally be other sidestreams.

At the top of the column, the vapour fraction is sent via the line 22 to a pressure-regulating system or a vacuum system (not represented). Recovered at the bottom of the column is a heavier fraction (secondary residue) enriched in HPNA relative to the residue 15 resulting from the fractionating section 12.

In a first variant, the pressure of the rectification column 21 is maintained above atmospheric pressure by means of a pressure-regulating device known to those skilled in the art.

In a second preferred variant, the pressure of the rectification column 21 is maintained below atmospheric pressure using a vacuum device. Any vacuum device known to those skilled in the art may be used. This may in particular be a device composed of steam ejectors, liquid ring pumps, and/or hydraulic ejectors. Use is preferentially made of steam ejectors and/or liquid ring pumps, and very preferentially of liquid ring pumps.

Provision may be made for an injection of stripping gas via the line 26. Advantageously, the stripping gas is steam, preferably low-pressure steam, in particular at a pressure of between 0.2 and 1.5 MPa. The injection line is located between the residue feed tray, into which the line 20 opens, and the point for discharging the secondary residue which opens into the line 16. It is preferably close to the point for discharging the secondary residue in the bottom of the column.

The sidestream, opening into the line 23, is positioned above the feed zone (line 20), so that the stream drawn off has a low concentration of HPNA, of less than 500 ppm by weight, preferentially of less than 350 ppm by weight and very preferentially of less than 200 ppm by weight, and, usually, a high proportion of fraction not converted in the hydrocracking section of at least 70% by weight of residue, preferentially of at least 80% by weight of residue and very preferentially of at least 90% by weight of residue.

All or part of said stream drawn off as sidestream (via the line 23) is recycled directly to the hydrocracking section 2. According to the invention, the secondary residue 16 is not recycled to the rectifying section 21 or to the fractionating section 12. Preferably, it is completely purged.

Figure 3:
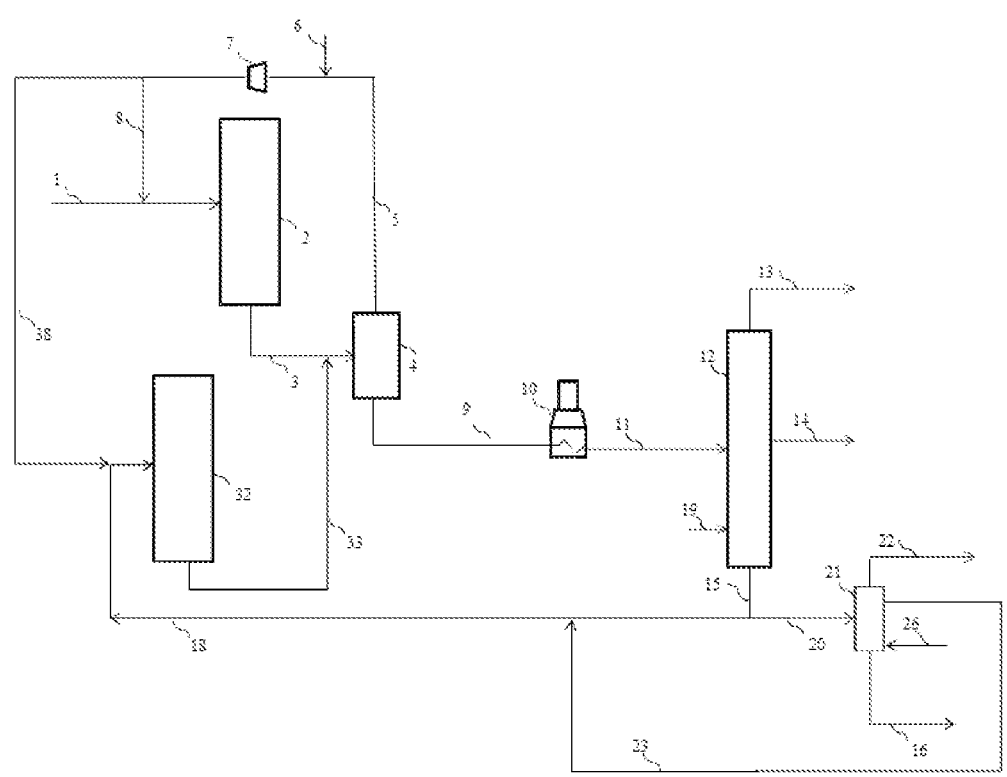

FIG. 3 represents a second embodiment of the process according to the invention, relating to a two-step hydrocracking (and not a one-step hydrocracking as represented in FIG. 2): This embodiment differs from the previous one by the fact that the hydrocarbons of line 18 are not recycled to the hydrocracking section 2. Instead, line 18 is recycled to another (second) hydrocracking section 32. This second hydrocracking section 32 is fed with hydrogen via the line 38.

The second hydrocracking section 32 has characteristics similar to those described previously for the (first) hydrocracking section 2. The effluent from the second hydrocracking section 32 is sent via the line 33 to a separation section. Preferably, this separation section is the separation section 4 which also receives the effluent 3 from the first hydrocracking section 2.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 2106409, filed Jun. 17, 2021 are incorporated by reference herein.

EXAMPLES

Example 1 (Comparative)

This example is based on the configuration from FIG. 1. The properties are reported in Table 1 below. It should be noted that, considering the configuration, the streams 15 and 18 have exactly the same properties.

The fractionation of the stream 11 in the column 12 was simulated by programming via the PRO/II version 10.2 software sold by the company Aveva, as was the rectification of the stream 20 in the column 21. The physical and analytical properties of the resultant streams were simulated and compared with the physical and analytical properties of the real samples.

The operating conditions of the columns used for the simulation are reported in Table 2 below.

From the properties of the inlet stream 11 of the fractionating column (see Table 1), the PRO/II simulation was able to establish the properties of streams 15, 18 and 16 and also the distribution of HPNA was able to be modelled.

On the basis of these results, the configurations of the invention were simulated. The results are disclosed below in Table 1, which indicates the properties/compositions of the streams according to the diagram from FIG. 1:

|  |  | Stream (FIG. 1) | | | |
| --- | --- | --- | --- | --- | --- |
| Configuration Stream number |  | 11 | 18 | secondary residue 16 | 29 |
| Yield (2) | wt % | 185.4 | 99.7 | 1.0 | 1.0 |
| Amount of diesel in the stream | wt % | 41.8 | 3.9 | 0.00 | 5.2 |
| Amount of hydrocarbons in the stream | wt % | 99.7 | 99.9 | 99.9 | 67.0 |
| Sp gr (1) ASTM D4052 |  | 0.837 | 0.849 | 0.850 | 0.847 |
| HPNA |  |  |  |  |  |
| Coronene | ppm by wt | 307 | 560 | 987 | 141 |
| Dibenzo(e,ghi)perylene | ppm by wt | 84 | 155 | 156 | 153 |
| Naphtho[8,2,1-abc]coronene | ppm by wt | 118 | 215 | 382 | 51 |
| Ovalene | ppm by wt | 79 | 144 | 269 | 22 |
| Total HPNA | ppm by wt | 588 | 1074 | 1795 | 367 |
| Distillation-ASTM D7213, wt % |  |  |  |  |  |
| Initial boiling point | ° C. | 88 | 336 | 416 | 326 |
| 10% | ° C. | 194 | 399 | 445 | 385 |
| 50% | ° C. | 397 | 465 | 496 | 430 |
| 90% | ° C. | 509 | 529 | 538 | 492 |
| Final boiling point | ° C. | 590 | 590 | 590 | 537 |

(1): Relative density ("specific gravity") Sp Gr = ρ sample at 20° C./ρ H$_2$O at 4° C. where ρ is the density expressed in g/cm$^3$, according to the standard ASTM D4052. (Same measurement method for all the examples)
(2): Yield = Flow rate of the stream/flow rate of feedstock of the unit. (Same calculation of the yield for all the examples)

Table 2 below specifies the operating conditions of the fractionating column:

| Fractionation operating conditions |  | FIG. 1 |
| --- | --- | --- |
| Pressure at top of column | MPa | 0.19 |
| Pressure at bottom of column | MPa | 0.24 |
| Feedstock inlet temperature | ° C. | 380 |
| Number of theoretical plates |  | 38 |
| Stripping steam flow rate | kg of steam/ tonne of bottoms | 50 |

Table 3 below specifies the operating conditions of the bottom stripper:

| Rectification operating conditions |  | FIG. 1 |
| --- | --- | --- |
| Pressure at top of column | MPa | 0.24 |
| Pressure at bottom of column | MPa | 0.25 |
| Feedstock inlet temperature | ° C. | 380 |
| Overhead outlet temperature (stream 29) | ° C. | 368 |
| Number of theoretical plates |  | 10 |
| Stripping steam flow rate | kg of steam/ tonne of bottoms | 500 |

Example 2 and the following examples illustrate the invention with the process of FIG. 2, with one hydrocracking section.

Example 2 (Invention)

Table 4 below gives the characteristics of the streams 11, 16 and 18 according to the configuration of the invention from FIG. 2 resulting from the PRO/II simulation. The operating conditions of the columns used for the simulation are reported in Tables 5 and 6:

| Configuration | | Stream from FIG. 2 | | | |
|---|---|---|---|---|---|
| Stream number | | 11 | 18 | 16 | 22 |
| Yield | wt % | 192.2 | 106.9 | 0.4 | 0.01 |
| Amount of diesel in the stream | wt % | 41.4 | 4.5 | 0.00 | 0.01 |
| Amount of hydrocarbons in the stream | wt % | 99.7 | 99.9 | 100.0 | 0.14 |
| Sp gr-ASTM D4052 | | 0.837 | 0.848 | 0.854 | 0.843 |
| HPNA | | | | | |
| Coronene | ppm by wt | 377 | 667 | 2483 | 0 |
| Dibenzo(e,ghi)perylene | ppm by wt | 81 | 144 | 393 | 0 |
| Naphtho[8,2,1-abc]coronene | ppm by wt | 89 | 156 | 962 | 0 |
| Ovalene | ppm by wt | 61 | 107 | 677 | 0 |
| Total HPNA | ppm by wt | 607 | 1074 | 4514 | 0 |
| Distillation-ASTM D7213, wt % | | | | | |
| Initial boiling point | ° C. | 88 | 330 | 442 | 240 |
| 10% | ° C. | 195 | 397 | 478 | 294 |
| 50% | ° C. | 398 | 463 | 527 | 343 |
| 90% | ° C. | 509 | 529 | 556 | 394 |
| Final boiling point | ° C. | 590 | 590 | 590 | 454 |

Table 5 below specifies the operating conditions of the fractionating column:

| Fractionation operating conditions | | FIG. 2 |
|---|---|---|
| Pressure at top of column | MPa | 0.19 |
| Pressure at bottom of column | MPa | 0.24 |
| Feedstock inlet temperature | ° C. | 380 |
| Number of theoretical plates | | 38 |
| Stripping steam flow rate | kg of steam/tonne of bottoms | 50 |

Table 6 specifies the operating conditions of the rectifying column:

| Rectification operating conditions | | FIG. 2 |
|---|---|---|
| Pressure at top of column | Pa (mmHg) | 5333 (40) |
| Pressure at bottom of column | Pa (mmHg) | 6000 (45) |
| Feedstock inlet temperature | ° C. | 357 |
| Overhead outlet temperature (stream 22) | ° C. | 100 |
| Number of theoretical plates | | 10 |
| Stripping steam flow rate | kg of steam/tonne of bottoms | 500 |

Compared to the configuration of the comparative Example 1, this configuration makes it possible to better concentrate the HPNA in the purge of the unit: 4514 ppm by weight in Example 2, compared with 1795 ppm by weight according to the comparative Example 1, i.e. a concentration two and half times higher. This makes it possible, at a same content of HPNA in the stream recycled to the hydrocracking step, to reduce the purge flow rate of the unit and therefore to increase the conversion of the unit from 99.0% to 99.6%. (The conversion is defined by the percentage of feedstock converted into lighter products compared to the feedstock of the unit).

In the configuration from the prior art (Example 1), the vapour from the rectifying section (stream 29) is rich in hydrocarbons up to 67% by weight (the remainder being water in vapour form). Conversely, in the configuration according to the invention (Example 2), the vapour from the rectifying section (stream 22) contains only traces of hydrocarbons up to 0.14% by weight, after treatment by a cooling system.

In the configuration according to the invention (Example 2), it is not therefore necessary to recycle the overhead vapour from the rectifying zone to the fractionating zone, to prevent a loss of upgradable products, unlike in the configuration from the prior art (Example 1). The water vapour can be recovered, notably in the vacuum system of the rectifying column.

Example 3 (Invention)

Table 7 below gives the characteristics of the streams 11, 16 and 18 according to another configuration of the invention from FIG. 2 resulting from the PRO/II simulation. The operating conditions of the columns used for the simulation are reported in Tables 8 and 9 below:

| Configuration | | Stream from FIG. 2 | | | |
|---|---|---|---|---|---|
| Stream number | | 11 | 18 | 16 | 22 |
| Yield | wt % | 185.4 | 99.7 | 1.0 | 0.01 |
| Amount of diesel in the stream | wt % | 41.8 | 4.3 | 0.00 | 0.01 |
| Amount of hydrocarbons in the stream | wt % | 99.7 | 99.9 | 100.0 | 0.13 |
| Sp gr-ASTM D4052 | | 0.837 | 0.849 | 0.854 | 0.843 |
| HPNA | | | | | |
| Coronene | ppm by wt | 148 | 265 | 987 | 0 |
| Dibenzo(e,ghi)perylene | ppm by wt | 32 | 58 | 156 | 0 |
| Naphtho[8,2,1-abc]coronene | ppm by wt | 34 | 60 | 382 | 0 |
| Ovalene | ppm by wt | 24 | 41 | 269 | 0 |
| Total HPNA | ppm by wt | 238 | 424 | 1795 | 0 |
| Distillation-ASTM D7213, wt % | | | | | |
| Initial boiling point | ° C. | 88 | 331 | 404 | 238 |
| 10% | ° C. | 194 | 399 | 451 | 293 |
| 50% | ° C. | 397 | 465 | 503 | 342 |
| 90% | ° C. | 509 | 529 | 545 | 394 |
| Final boiling point | ° C. | 590 | 590 | 590 | 456 |

Table 8 specifies the operating conditions of the fractionating column:

| Fractionation operating conditions | | FIG. 2 |
|---|---|---|
| Pressure at top of column | MPa | 0.19 |
| Pressure at bottom of column | MPa | 0.24 |
| Feedstock inlet temperature | ° C. | 380 |
| Number of theoretical plates | | 38 |
| Stripping steam flow rate | kg of steam/tonne of bottoms | 50 |

Table 9 specifies the operating conditions of the rectifying column:

| Rectification operating conditions | | FIG. 2 |
|---|---|---|
| Pressure at top of column | Pa (mmHg) | 5333 (40) |
| Pressure at bottom of column | Pa (mmHg) | 6000 (45) |
| Feedstock inlet temperature | °C. | 358 |
| Number of theoretical plates | | 10 |
| Stripping steam flow rate | kg of steam/ tonne of bottoms | 500 |

Compared to the configuration from the prior art (Example 1), this configuration (Example 3) makes it possible to reduce the concentration of HPNAs in the stream recycled to the hydrocracking step: 424 ppm by weight (Example 3) compared with 1074 ppm by weight (Example 1), i.e. a reduction by at least a factor of 2.5. This makes it possible, at the same conversion, to reduce the amount of HPNA which returns to the hydrocracking step, and therefore to reduce the poisoning of the catalyst by the HPNAs, thus increasing the cycle life of the catalyst.

In the configuration from the prior art (Example 1), the vapour from the rectifying section (stream 29) is rich in hydrocarbons up to 67% by weight. Conversely, in the configuration according to the invention (Examples 2 and 3), the vapour from the rectifying section (stream 22) contains only traces of hydrocarbons up to 0.13% by weight. In the configuration according to the invention, it is not therefore necessary to recycle the overhead vapour from the rectifying zone to the fractionating zone, to prevent a loss of upgradable products, unlike in the configuration from the prior art.

Example 4 (Invention)

Table 10 below gives the characteristics of the streams 11, 16 and 18 according to another configuration of the invention from FIG. 2 resulting from the PRO/II simulation. The operating conditions of the columns used for the simulation are reported in Tables 11 and 12.

| Configuration | | Stream from FIG. 2 | | | |
|---|---|---|---|---|---|
| Stream number | | 11 | 18 | 16 | 22 |
| Yield | wt % | 185.4 | 99.7 | 1.0 | 0.01 |
| Amount of diesel in the stream | wt % | 41.8 | 4.3 | 0.1 | 0.00 |
| Amount of hydrocarbons in the stream | wt % | 99.7 | 99.9 | 99.9 | 0.04 |
| Sp gr-ASTM D4052 | | 0.837 | 0.849 | 0.850 | 0.844 |
| HPNA | | | | | |
| Coronene | ppm by wt | 303 | 554 | 987 | 0 |
| Dibenzo(e,ghi)perylene | ppm by wt | 50 | 91 | 156 | 0 |
| Naphtho[8,2,1-abc] coronene | ppm by wt | 113 | 205 | 382 | 0 |
| Ovalene | ppm by wt | 79 | 145 | 269 | 0 |
| Total HPNA | ppm by wt | 545 | 996 | 1795 | 0 |
| Distillation-ASTM D7213, wt % | | | | | |
| Initial boiling point | °C. | 88 | 331 | 390 | 209 |
| 10% | °C. | 194 | 399 | 440 | 313 |
| 50% | °C. | 397 | 465 | 494 | 361 |
| 90% | °C. | 509 | 529 | 538 | 408 |
| Final boiling point | °C. | 590 | 590 | 590 | 463 |

Table 11 specifies the operating conditions of the fractionating column:

| Fractionation operating conditions | | FIG. 2 |
|---|---|---|
| Pressure at top of column | MPa | 0.19 |
| Pressure at bottom of column | MPa | 0.24 |
| Feedstock inlet temperature | °C. | 380 |
| Number of theoretical plates | | 38 |
| Stripping steam flow rate | kg of steam/ tonne of bottoms | 50 |

Table 12 specifies the operating conditions of the rectifying column:

| Rectification operating conditions | | FIG. 2 |
|---|---|---|
| Pressure at top of column | MPa | 0.189 |
| Pressure at bottom of column | MPa | 0.20 |
| Feedstock inlet temperature | °C. | 380 |
| Number of theoretical plates | | 10 |
| Stripping steam flow rate | kg of steam/ tonne of bottoms | 500 |

Compared to the configuration from the prior art, this configuration makes it possible to reduce the concentration of HPNAs in the stream recycled to the hydrocracking step: 996 ppm by weight according to Example 4 compared with 1074 ppm by weight from Example 1, i.e. a reduction of around 8%. This makes it possible, at the same conversion, to reduce the amount of HPNA which returns to the hydrocracking step, and therefore to reduce the poisoning of the catalyst by the HPNAs, thus increasing the cycle life of the catalyst.

It is also seen that Example 4 gives advantageous results, however they are lower than those obtained in Examples 2 and 3, owing to the choice of a rectification pressure P2 having a smaller difference with the fractionation pressure P1.

In the configuration from the prior art (Example 1), the vapour from the rectifying section (stream 29) is rich in hydrocarbons up to 67% by weight. Conversely, in the configuration according to the invention (Example 4), the vapour from the rectifying section (stream 22) contains only traces of hydrocarbons up to 0.04% by weight. In the configuration according to the invention, it is not therefore necessary to recycle the overhead vapour from the rectifying zone to the fractionating zone to prevent a loss of upgradable products, unlike in the configuration from the prior art (Example 1).

Examples 2 to 4 relate to an embodiment of the invention with a unit using one hydrocracking section, as represented in FIG. 2. The invention provides the same advantages, or similar advantages, with respect to HPNAs when it is applied to a hydrocracking unit with two successive hydrocracking sections, as represented in FIG. 3.

In both cases, the invention is very flexible in its implementation. Thus, it can offer several possible choices, in particular depending on the amount of residue containing the HPNAs which is purged:

favouring the increase in yield, by dealing with the same amount of HPNAs, but by purging less of the residue containing same, or favouring the service life of the hydrocracking catalyst, at the same yield, by purging more (or even all) of the residue containing the HPNAs, or any choice intermediate between the two preceding choices.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for hydrocracking a petroleum feedstock (1) comprising at least 10% by volume of compounds that boil above 340° C., said process comprising:
   (a) at least one step of hydrocracking the feedstock in order to obtain a hydrocracked effluent;
   (b) a step of liquid/gas separation of the hydrocracked effluent in order to obtain a gaseous effluent (5) and a liquid effluent (9);
   (c) a step of fractionating said liquid effluent (9), in at least one fractionating column (12), at a pressure P1 at the bottom of the column, to produce at least a first distillate (13, 14) and a first residue (15),
   (d) a step of recycling a first portion (18) of said first residue (15) to the hydrocracking step and/or at least one of the hydrocracking steps,
   (e) a step of rectifying a second portion (20) of the first residue (15) obtained in the fractionating step, carried out in at least one column (21), at a pressure P2 at the top thereof which is at least 0.05 MPa lower than pressure P1, to obtain at least a secondary distillate (23), a secondary residue (16) and a vapor stream (22),
   (f) a step of purging at least one portion or all of the secondary residue (16),
   (g) a step of recycling all or part of said secondary distillate (23) to the hydrocracking step or to at least one of the hydrocracking steps, after an optional gas separation step.

2. The process according to claim 1, wherein said process is free of a step of recycling, to the fractionating step (c), all or part of the secondary distillate (23) and/or all or part of the secondary residue (16) and/or all or part of the overhead vapor stream (22) which result from the rectifying step (e).

3. The process according to claim 1, wherein the pressure P2 at the top of the column (21) of the rectifying step is lower than the pressure P1 in the bottom of the column of the fractionating step (c) by at least 0.06 MPa.

4. The process according to claim 1, wherein the pressure P2 at the top of the column (21) of the rectifying step (e) is lower than atmospheric pressure.

5. The process according to claim 1, wherein the rectifying step (e) uses a distillation column (21) equipped with feed tray(s), optionally with packing and with draw-off tray(s), and in that:
   the first residue (15) from the fractionating step (c), optionally at least partially vaporized, feeds said distillation column (21) at at least one feed tray,
   the secondary distillate (23) is drawn off from said distillation column (21) at a draw-off tray,
   the secondary residue (16) is drawn off at the bottom of said distillation column (21), and
   the overhead vapor stream (22) is cooled.

6. The process according to claim 1, wherein the rectifying step (e) uses a distillation column (21) equipped with feed tray(s), optionally with packing and with draw-off tray(s), and step (e) is carried out with a stripping gas.

7. The process according to claim 1, wherein, in the rectifying step (e), the first residue (15) is fed at a temperature of between 250° C. and 400° C.

8. The process according to claim 1, wherein the second portion (20) of the first residue (15) which is treated in the rectifying step (e) corresponds to at most 50% by weight of the first residue obtained in the fractionating step (c).

9. The process according to claim 1, wherein, in the purging step (f), at least 20% by weight of the secondary residue (16) is purged.

10. The process according to claim 1, wherein the fractionating step and/or the rectifying step are carried out with a stripping gas.

11. The process according to claim 10, wherein the stripping gas of the fractionating step is injected at a pressure of between 0.2 and 0.4 MPa, and/or the stripping gas of the rectifying step is injected at a pressure of between 0.001 and 0.35 MPa.

12. The process according to claim 1, wherein said process has one or two hydrocracking steps (a), and at least one of said one or two hydrocracking steps is preceded by a hydrotreating step (h).

13. The process according to claim 1, wherein the pressure P2 at the top of the column (21) of the rectifying step is lower than the pressure P1 in the bottom of the column of the fractionating step (c) by at least 0.08 MPa.

14. The process according claim 1, wherein the pressure P2 at the top of the column (21) of the rectifying step (e) is between 1333 Pa and 0.08 MPa.

15. The process according to claim 1, wherein the second portion (20) of the first residue (15) which is treated in the rectifying step (e) corresponds to at most 20% by weight of the first residue obtained in the fractionating step (c).

16. The process according claim 1, wherein, in the purging step (f), at least 40% by weight of the secondary residue (16) is purged.

17. The process according to claim 1, wherein said process is free of a step of recycling, to the fractionating step (c), all or part of the overhead vapor stream (22) resulting from the rectifying step (e).

18. The process according to claim 1, wherein pressure P1 is between 0.2 and 0.4 MPa.

19. A plant for hydrocracking a petroleum feedstock comprising at least 10% by volume of compounds that boil above 340° C., said plant successively comprising:
   (a) at least one section (2) for hydrocracking the feedstock (1) in order to obtain a hydrocracked effluent,
   (b) at least one section (4) for liquid/gas separation of the hydrocracked effluent in order to obtain a gaseous effluent (5) and a liquid effluent (9),
   (c) a section for fractionating said liquid effluent, comprising at least one column (12), at a pressure P1 at the bottom of the column, to produce at least a first distillate (13, 14) and a first residue (15),
   (d) a line for recycling a first portion (18) of said first residue (15) to one of the at least one hydrocracking section (2),
   (e) a section for rectifying a second portion (20) of the first residue (15) obtained in the fractionating zone, comprising at least one column (21), at a pressure P2 at the top thereof which is at least 0.05 MPa lower than the pressure P1, to obtain at least a secondary distillate (23), a secondary residue (16) and a vapor stream (22),
   (f) a section for purging at least one portion, or all, of the secondary residue (16), and
   (g) a line for recycling all or part of said secondary distillate (23) to the hydrocracking section (2) or at least one of the hydrocracking sections, after an optional gas separation section,
wherein said plant is free of a line for recycling all or part of the of the overhead vapor stream (22) resulting from the rectifying step (e).

20. The plant according to claim 19, wherein said plant is free of a line for recycling all or part of the secondary distillate (23) and/or all or part of the secondary residue (16) which result from the rectifying zone (e) to the fractionating zone (c).

21. The plant according to claim 19, wherein the rectifying zone (e) is equipped with pressure control devices, either of pressure regulator type if the pressure P2 is greater than atmospheric pressure, or of vacuum device type if the pressure P2 is lower than atmospheric pressure.

22. The plant according to claim 19, further comprising:
one or two hydrocracking section(s) (2) equipped with a feedstock inlet line (1) and a hydrogen inlet line (8),
the fractionating section (12) comprising at least one distillation column equipped with trays, said distillation column producing a first distillate and a first residue (15),
the section for rectifying a second portion (20) of the first residue (15), comprising at least one distillation column (21) equipped with trays and/or packing, said distillation column of the section for rectifying a second portion (20) of the first residue (15) comprising:
at least one inlet line (20) for the second portion of the first, at least partially vaporized residue at at least one feed tray,
at least one line (22) connected to a pressure regulation or vacuum system,
at least one line (23) for drawing off at least the secondary distillate at a draw-off tray,
at least one line (16) for drawing off, at the bottom of the column, said secondary residue,
at least one optional line (26) for injecting a stripping gas, the injection point being located below the feed tray of the stream (20), and
an optional line (18) for recycling a portion of said secondary residue resulting from the fractionating section directly to the or one of the hydrocracking section(s).

* * * * *